United States Patent [19]

Marcantonio

[11] 4,131,552

[45] Dec. 26, 1978

[54] HIGH TEMPERATURE RELEASE AND LUBRICATING COMPOSITIONS FOR GLASS MOLDS

[75] Inventor: Arnold F. Marcantonio, Muncie, Ind.

[73] Assignee: Ball Corporation, Muncie, Ind.

[21] Appl. No.: 841,795

[22] Filed: Oct. 13, 1977

Related U.S. Application Data

[63] Continuation of Ser. No. 579,350, May 21, 1975, abandoned, which is a continuation-in-part of Ser. No. 445,756, Feb. 25, 1974, abandoned.

[51] Int. Cl.$^2$ .................... C10M 1/10; C10M 3/02; C10M 5/02; C10M 7/04
[52] U.S. Cl. .......................................... 252/29; 65/24; 65/26; 65/170; 252/45; 252/49.5; 252/52 A; 252/52 R
[58] Field of Search .............. 252/29, 45, 52 A, 52 R, 252/49.5; 65/24, 26, 170

[56] References Cited

U.S. PATENT DOCUMENTS

| | | | |
|---|---|---|---|
| 3,025,638 | 3/1926 | Krawetzke et al. | 65/24 |
| 3,354,129 | 11/1967 | Edmonds et al. | 260/79 |
| 3,874,862 | 4/1975 | Bickling et al. | 252/29 |
| 3,928,673 | 12/1975 | Pardee et al. | 252/29 |
| 3,994,847 | 11/1976 | Marcantonio et al. | 65/24 |

Primary Examiner—Irving Vaughn
Attorney, Agent, or Firm—Gilbert E. Alberding

[57] ABSTRACT

Release and lubricating composition for avoiding seizure between molten glass and metal molds for forming glass articles, for minimizing wear between mold sections and for improving the pack of glassware, comprising, a dispersion of graphite in a polyphenylene sulfide, molds having such composition coated thereon, and a method of applying the composition to molten glass contacting surfaces comprising dispersing the composition containing graphite with the polyphenylene sulfide in the form of small particles in a carrier, applying the dispersed composition to the glass contacting surface and then curing the coating at an elevated temperature, including curing resulting from hot molds during glassware production.

10 Claims, No Drawings

HIGH TEMPERATURE RELEASE AND LUBRICATING COMPOSITIONS FOR GLASS MOLDS

This application is a continuation of application Ser. No. 579,350, filed May 21, 1975, now abandoned, which is a continuation-in-part of application Ser. No. 445,756, filed Feb. 25, 1974, now abandoned.

BACKGROUND OF THE INVENTION

1. Field of the Invention

The present invention relates generally to glass forming and more particularly to preventing seizure and sticking of molten glass to metal forming molds as, for instance, glassware forming molds, and lubrication of such forming molds under extreme temperatures.

2. Description of the Prior Art

It is well known to form glass by shaping highly viscous molten glass in metal forms or molds until the glass cools sufficiently to maintain the induced form. One particularly demanding process for forming glass is the formation of glassware such as bottles. In this process, a glob of molten glass is typically first formed by a blank mold into a parison having a finished portion corresponding to the neck portion of the desired glassware. A neck ring engaging the finish portion of the parison is utilized to transport and place the parison in a blow mold, which is distinct from the blank mold, wherein blowing and cooling air or wind is conducted to the interior of the parison to force it into conformity with the blow mold and thereby to form the glassware.

Since molten glass will adhere to hot metal, and since the various mold sections will quickly wear if not lubricated, it is necessary to apply a release and lubricating agent to the molds. However, the glassware-forming process is exceedingly demanding upon release agents and lubricating compositions in that much of the heat from the molten glass is carried off through the metal molds in order to lower the surface temperature and viscosity of the formed glassware in that which permits the glassware to be self-supporting. Thus, since the molten glass is initially at a temperature of about 1800° F., to about 2200° F., and since the metal mold is usually hot below about 950° F., to 975° F., it will be appreciated that the parting agent interposed between the molten glass and the metal molds will be subjected to most extreme and intensified heat stresses. However, the molten glass will stick to metal if the release agent is vaporized and the mold parts will wear rapidly if the lubricating agent is not maintained.

Heretofore, a "dope", typically a dispersion of graphite in a light petroleum product such as kerosene, has been applied periodically by hand-held swab sticks to prevent sticking of glass to metal molds and to provide lubrication of the interacting mold sections. The drawbacks of this composition and application approach include the short period for which such dope is effective, the flashing of objectionable hydrocarbon vapors and the loss of glassware. Since the glass molds are at an elevated temperature, the petroleum product is flashed off quickly from the mold and constitutes an environment and fire hazard. Attempts to collect the vapor with hoods and other apparatus design have often resulted in unfavorable conditions. Often fires from the condensation of oils in the vicinity of the glass-forming machine results. Frequent venting of the petroleum products to the atmosphere is, of course, not desirable.

Production of glassware is also adversely effected by the use of the petroleum oils-graphite swabbing composition. When the petroleum product flashes off, it lowers the temperature of the mold thereby increasing the possibility of "check" defects in the glassware formed immediately after swabbing. Further, the first several articles formed after swabbing commonly have graphite particles embedded therein and must be rejected by inspectors as defective glassware. This results in a loss of pack or efficiency on the order of three percent or more of the glassware. This, of course, is an unfavorable condition.

Use of water-based carriers in place of the petroleum carriers for graphite, and other materials, have not heretofore been satisfactory. Objectionable odor problems and smoke, or fumes have marked the use of certain other proposed mold lubricants.

Further discussion of the long-existing problems with swabbing of molds and the effects to avoid or live with these problems found in U.S. Pat. Nos. 3,141,752; 3,480,422; 3,508,893; 3,523,016 and 3,623,856.

As might be expected, the above enumerated drawbacks and inefficiencies attendant to the dispersion of graphite in a petroleum base has led to numerous efforts to replace this composition with a more advantageous swabbing or parting agent. Except for narrow or marginal success under the less extreme of normal operating conditions, no suitable compounds have heretofore been known.

Elevated mold temperatures during glassware production make it difficult to successfully wet the mold surface when applying a swabbing composition. This is particularly true of formulations containing water. This problem is severely compounded when a constituent which will coat the mold, quickly cure and secure the graphite is included in the swabbing composition.

Examples of otherwise excellent lubricants and parting agents which have been tested in the demanding environment of glassware production and found to be inadequate include water-soluble graphite paste, high-pressure impingement with molybdenum disulfide with binder and various aqueous and or alcohol base swabs. Some minor previous success has been obtained with coating for 6 to 8 hour runs on conventional glass-forming machines, but these have proven to be extremely difficult to apply and have not provided reproducible results. Except for attempts to substitute another carrier for the petroleum product, few previous attempts have coped with the problem of swabbing during production.

While at first encounter, it would appear that the existence of and knowledge of many different lubricants would determine a satisfactory release and lubricating system for glass molds could easily be formulated, this has not been the case. However, as discussed in U.S. Pat. No. 3,495,962, the extreme conditions and varying, somewhat incompatible, requirements of glassware forming molds have presented formidable barriers to the technology. At the present, the above-discussed petroleum and graphite swabbing dopes is almost universally employed.

U.S. Pat. No. 2,052,629 further discusses glass and mold lubricants and release agents.

SUMMARY OF THE INVENTION

The present invention, which provides a heretofore unavailable improvement over the previously used release and lubricating compositions especially adapted for avoiding seizure between molten glass and metal molds, comprises a composition of graphite, polyphenylene sulfide, and a carrier. The present invention also relates to a method of applying the compositions, and the surfaces treated with said compositions. Instead of periodic applications of the release and lubricating compositions, the compositions of the subject invention is effective for relatively extended periods of time, but may be renewed by swabbing the aforementioned compositions during production of glassware. This minimizes a loss of pack and efficiency resulting from periodic inclusion of graphite in the glassware surface and the altering of operation temperatures. Also, contamination of the surrounding machinery and the atmosphere with oily fumes and vapors are greatly reduced or completely avoided.

Accordingly, an object of the present invention is to provide and improve parting and lubrication system for glassware molds.

Another object of the present invention is to provide a parting and lubrication system which provides extended effectiveness thereby minimizing periodic swabbing or treatment of the molds during production.

Yet another object of the present invention is to provide and improve parting and lubrication system to improve the pack of glassware formed.

Still another object of the present invention is to provide a parting and lubricating system which can be periodically renewed without materially effecting the production of glassware.

Further, another object of the present invention is to provide a parting and lubrication system for glassware molds which may optionally be either prior to the production process or swabbed during the actual production.

Yet still another object of the present invention is to provide a lubrication system for glassware molds which lubricates the more stressed portions of the glassware molds, such as the neck rings or blank molds, for an extended period of time.

Still another object of the present invention is to provide a glassware parting and lubrication system which obviates contamination of glass-forming machines and the atmosphere with oily fumes from a swabbing compound.

These and other objects and features of the present invention will become apparent from the following description.

DETAILED DESCRIPTION OF THE INVENTION

According to the present invention, glassware forming molds are treated with a release and lubricating composition comprising a dispersion of polyphenylene sulfide, graphite, and a carrier.

In its broader aspects, this invention contemplates a composition useful as a release and lubricating composition comprised of from about 0.5 to about 20 weight percent polyphenylene sulfide, about 0.2 to about 60 weight percent graphite, and about 20 to about 99 weight percent of a carrier.

The polyphenylene sulfides function essentially as binders. Their preparation may be generally carried out by the reaction of at least one polyhalo-substituted aromatic compound with an alkali metal sulfide in a polar organic compound reaction medium. The preparation of the polyphenylene sulfide is discussed in U.S. Pat. No. 3,354,129. Generally, the polyphenylene sulfides produced are high melting, thermoplastic materials which have excellent high temperature stability. The polyphenylene sulfide produced from such preparations may be represented by the following general formula:

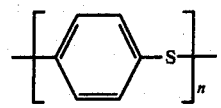

wherein "n" is a whole number. The molecular weight of such materials is at least 1000, but generally is in a range between 1,200 to 200,000 and more usually a molecular weight of about 50,000. The polyphenylene sulfides undergo fusion and crosslinking when temperatures are in excess of 550° F. It may be assumed that, after curing, the polyphenylene sulfide crosslinks into a very high molecular weight composition. A preferred polyphenylene sulfide is one having an inherent viscosity, [n] 206° C. = 0.16 as measured in chloronaphthalene and a melting point of about 550° F., as determined by differential thermal analysis. Generally, about 0.5 to about 20 weight percent of polyphenylene is preferred.

Graphite is, of course, a well-known lubricant. While particle size is not critical, particle sizes ranging from about 25 microns or lower are useful. Preferably, particle sizes of less than about 50 microns should be employed to produce a desirable smooth coating. The graphite or carbon used in the subject invention may be any of various carbon blacks, flake and colloidal graphite or conventional graphite known to the trade. Further, it is understood that either natural or synthetic forms of graphite can be satisfactorily employed in accordance with the present invention. The carbon or graphite may be of technical or spectro grade. It is generally preferred to have about two parts by weight polyphenylene sulfide to one part by weight graphite, yet a ratio of 1:1 to 1:2 of polyphenylene sulfide to graphite may also work satisfactory.

It will be appreciated that other lubricants may be used in conjunction with graphite, these include molybdenum disulfide, calcium fluoride, cadmium oxide, lead monoxide, and boron nitride. The amount of the solid lubricant can vary between about 0.2 to about 60 weight percent of the total mixture.

The carrier employed in the subject invention is one having boiling points in excess of at least 350° F. The carrier functions as a non-smoking liquid to transport particles of polyphenylene sulfide and graphite to a given surface.

Preferred carriers for swabbing comprise polyalkylene oxides and derivatives of fatty acids including epoxidized glycerides of linolenic, oleic, linoleic and saturated fatty acids. Other carriers may be employed and include polyhydric alcohols such as glycerin, ethylene glycol, sorbitol, etc., can be substituted. When polyhydric alcohols which are liquid at room temperature are used, water may be admixed therewith. The carrier may be diluted with water and other solvents such as, for instance, methanol, ethanol, isopropanol, etc. The amount of carriers which may be employed may range from about 20 to about 99 weight percent.

The composition may include in minor amounts (about 2 weight percent or less) other additives such as wetting agents, dispersing agents or thickening agents to enhance certain properties. Also, certain inorganic compounds may be added to improve oxidation resistance, thermal resistance, and wear resistance of the composition. This latter class of compounds include $TiB_2$, $B_4C$, $SnO$, $ZnCrO_4$, $PbPO_3$, $As_2S_4$, $TiO_2$, carbon and the like.

A number of wetting agents or dispersing agents may be used so that the polyphenylene sulfide and graphite are properly wetted or dispersed in the mixture. Conventional wetting agents such as octylphenoxy polyethoxy ethanol (Triton X-100) polyethylene glycol ether of mixtures or linear alcohols of from $C_{11}$ to $C_{15}$, as well as ethoxylated aliphatic alcohols are included for the well-known function such additives serve. It should, however, be noted that such agents when used with, for instance, only water, do not adequately wet a mold at operating temperatures when applied by swabbing. The amounts of these agents incorporated into the composition of this invention may range preferably, between about 1 to about 2 percent by weight.

A number of thickening agents may be used and are conventional and include cellulose derivatives, such as carboxymethyl cellulose, hydroxypropoxymethyl cellulose, hydroxymethyl cellulose, methyl cellulose, ethyl hydroxyethyl cellulose, etc., may be included. The thickening agent may be added in an amount ranging from about 0.01 to about 5 percent by weight.

Generally, the range of ingredients useful in the subject invention may be varied over a wide range. A preferred composition includes about 11 percent polyphenylene sulfide, about 7 percent graphite, about 64 percent n-butoxy poly (ethoxypropoxy) propanol, about 1.6 percent octylphenoxy polyethoxy ethanol as a wetting agent, about 0.4 percent carbethoxymethyl cellulose as a thickening agent, and about 16 percent water. Another preferred composition in accordance with the subject invention comprises about 10 percent polyphenylene sulfide, about 5 percent graphite, about 42 percent ethylene glycol, and about 42 percent water, and about 1 percent octylphenoxy polyethoxy ethanol. Still another preferred composition comprises a mixture of 4 percent by weight graphite with 2 percent carbon black, 92 percent of epoxidized linseed oil, 1 percent polyphenylene sulfide and about 1 percent of an emulsifying agent.

Preparation of the mold prior to coating before its use as opposed to swabbing usually consists of abrasion and degreasing. If desired, chemical conversion coatings such as phosphate coatings may be used, but satisfactory results are attainable with a clean mold metal surface. A slight roughness which may be achieved through sandblasting of the mold surfaces, as is conventional in the art, is generally also desirable with the present invention. As a general rule, blank molds and neck rings can tolerate rougher surfaces while blow mold should be smoother.

The compositions of the present invention may be applied to the prepared mold system by any of the conventional means such as brushing, spraying, dipping, or blowing onto the surface. Spraying or brushing is preferred.

After a uniform and smooth, thin coating is produced on the metal surface, the coated surfaces may be baked first at a low temperature or air dried at room temperature to remove the carrier and thereafter at an elevated temperature to remove any residual carrier and volatile constituents. At the elevated temperatures the polyphenylene sulfide is affixed to the surface. Although not limiting various baking temperatures may be employed. Thus, temperatures between 105° F., to about 300° F., for a period of one half to about 2 hours serve to adequately remove the carrier during a low temperature baking period. Thereafter, heating at a temperature above about 590° F., for a period of about 0.5 to about 2 hours serves to affix the polyphenylene sulfide and remove traces of volatile constituents. Since glassware molds often must be preheated to an elevated temperature prior to installation and use on glassware-producing machines, it is convenient to utilize the production preheating period as a second baking period. The low temperature bake can be shortened or omitted entirely without a substantial change in coating quality.

After curing, the composition adheres tenaciously to the molds, which are made of iron or iron alloys, in a thin, uniform coating of polyphenylene sulfide and with graphite uniformly dispersed thereon. Coating thickness may vary considerably between 0.00025 and 0.01 inch, but preferably is held toward the thinner portion of this range, and optimum between 0.002 and 0.0005 inch. It has been observed that the coating is thermally stable, oxidation resistant and conducts heat quite well. This latter point is important as explained herein in that the heat from the outer surface of the glass must be conducted from the formed article into the mold.

Since the compositions herein are aqueous systems there is no formation of obnoxious odor associated with earlier petroleum-based formulations. Further, production rates are increased over that of the conventional swabbing formulation of the past.

It has been found that the particular compositions of the subject invention do not contaminate the glass surface to any substantial extent as did the conventional petroleum-graphite swab compositions. Even when applied by swabbing, the time interval is two times to twelve times longer between swabbing application than the time with conventional formulations. Accordingly, the efficiency of the glass production operation, as measured by percent packed is greatly improved.

It should be pointed out that without frequent conventional swabbing, the conventional mold composition will not produce glass. Even after initial swabbing, a conventional mold will not continue to produce glassware if not again swabbed within an hour, or more realistically, within 10 to 20 minutes. Thus, from a threshold consideration any production of glass without initial swabbing and any continued production of glass articles after 30 to 60 minutes of swabbing indicates an improvement over previous results. Thus, it is readily apparent that the compositions of this invention are unique and possess unexpected properties which make them well suited for the uses disclosed herein.

The following Examples illustrate the practice of this invention:

EXAMPLE I

A lubricating composition was prepared by taking 100 parts by weight of poly(p-phenylene sulfide) into 595 parts of ethylene glycol to which was added about 8 parts of octylphenoxy polyethoxy ethanol. This mixture was blended for about 10 minutes. To this mixture were added 50 parts of graphite and thereafter 255 parts water. The mixture was ball milled for about 6 hours until it had an average viscosity of about 20 cps as determined by Brookfield, Spindle No. 4, RPM 60, (Temp., 72° F.). The ball milling temperature was maintained at about 80° F. The average particle size was about 30 microns. The resulting dispersion contained about 10 percent poly(p-phenylene sulfide), about 5 percent graphite, about 59 percent ethylene glycol, about 25 percent water, and about 1 percent wetting agent. This was designated Composition X.

Using the same mixing procedures as recited above, with the exception that n-butoxy poly (ethoxypropoxy) propanol was substituted for ethylene glycol, the following compositions as recited in the Table were prepared:

| COMPOSITIONS | A | B | C | D |
|---|---|---|---|---|
| Polyphenylene sulfide | 11.0 | 11.0 | 6.0 | 9.0 |
| Graphite | 7.0 | 7.0 | 4.0 | 6.0 |
| n-butoxy poly (ethoxypropoxy) propanol | 64.0 | 56.0 | 63.0 | 63.0 |
| Wetting Agent (1) | 1.6 | 2.0 | 0.8 | 1.6 |
| Thickening Agent (2) | 0.4 | 0.1 | 0.2 | 0.4 |
| Water | 16.0 | 24.0 | 27.0 | 20.0 |

NOTE: Percent based on weight
(1) octylphenoxy polyethoxy ethanol
(2) Carbopol 934, (B.F. Goodrich Company)

EXAMPLE II

A blank mold and neck ring molds were lightly sand-blasted to produce a satin finish, solvent cleaned, and coated with Composition X, while preheated to a temperature of about 200° F. The Composition X was applied by spraying through a Binks air sprayer to produce a coating on the blank mold of between about 0.002 and 0.025 inch thickness. The blank mold was then maintained at a temperature of about 700° F., for about 30 minutes to remove the carrier and to set the poly(p-phenylene sulfide) upon the surface of the molds.

After preheating at about 700° F., for about 1 hour, the mold was placed upon an independent section glass-forming machine and used to produce commercial glassware of the 32 oz. jar type. Without swabbing, the blank mold operated satisfactorily for about 23 hours. The neck rings operated satisfactorily for about 19 hours.

EXAMPLE III

The neck ring molds were coated with the composition designated X of Example I utilizing the procedure described in Example II. The blank molds were not precoated. After installing these molds on an individual section glass-forming machine for producing 16 oz. glassware containers, swabbing composition designated Composition A was swabbed periodically every 2 hours on the blank molds only. After 6 hours the neck ring molds were swabbed with Composition A every 3 hours thereafter. The containers produced were of fine quality and were continuously produced.

EXAMPLE IV

The compositions designated "B" from the Table was made as in Example I and sprayed over a prepared blank mold which was lightly sand-blasted. A coating was produced on the blank mold of between about 0.002 and about 0.05 inch thickness. The mold so coated was heated to a temperature of about 650° F., for about 1 hour to remove the carrier and to set the poly (p-phenylene sulfide) upon the surface of the mold. The mold was placed in a glass forming machine and used to produce commercial glassware. It produced satisfactory glassware for about 15 hours without swabbing.

EXAMPLE V

An uncoated ring mold on a glass-forming machine was lubricated by swabbing every 45 minutes and utilized to produce 7 oz. glassware, the lubricating composition being that designated as Composition C. The glassware produced was of excellent quality and was continuously afforded.

EXAMPLE VI

Blow molds were precoated and baked at 700° F. for 1 hour with Composition D. The blow mold provided more than 48 hours of satisfactory service without swabbing when mounted on an independent section machine utilized to produce 8 oz. glassware.

EXAMPLE VII

A lubricating composition for coating mold and mold parts was prepared by taking 100 parts by weight of poly(p-phenylene sulfide) into 200 parts by weight of ethylene glycol to which were added about 8 parts by weight of octylphenoxy polyethoxy ethanol. This mixture was blended for about 15 minutes. To this mixture were added 50 parts by weight of graphite and thereafter 200 parts of water. The mixture was ball milled at room temperature for at least 6 hours until the mixture had an average viscosity of about 100 cps as determined by Brookfield, Spindle No. 4, RPM 60, (72° F.). The resulting dispersion contained about 18 percent by weight poly(p-phenylene sulfide), about 9 percent graphite, about 36 percent ethylene glycol, about 36 percent water, and about 1 percent octylphenoxy polyethoxy ethanol.

A blank mold and neck rings were thoroughly cleaned and dipped into the lubricating composition and the precoated mold was placed in an oven at 650° F., for 1 hour. The mold was taken from the oven and placed in an independent section glass-forming machine to produce pint size, wide-mouth bottles. The molds produced bottles at a rate of 10 bottles per minute for about 7 hours before swabbing was necessary and then swabbed every 2.5 hours with Composition A. The bottles were of excellent quality.

EXAMPLE VIII

A clean blank mold was sprayed with a coating prepared by taking 100 parts by weight poly(p-phenylene sulfide) into 162 parts of ethylene glycol and 735 parts of a solution consisting of 70 weight percent sorbitol and 30 weight percent water, to which were added 2 parts by weight of octylphenoxy polyethoxy ethanol. This mixture was blended for about 20 minutes. To this mixture were added 65 parts by weight graphite and thereafter 162 parts of water. This mixture was ball milled for about 5 hours until it had an average viscosity of about 700 cps as determined by Brookfield, Spindle No. 4, RPM 60, (72° F.). The resulting dispersion contained about 9 percent by weight poly(p-phenylene sulfide), about 6 percent graphite, about 68 percent aqueous sorbitol, about 15 percent ethylene glycol, and about 2 percent by weight of octylphenoxy polyethoxy ethanol.

The lubricating coating on the mold was placed in an oven at 650° F., for 1 hour. The coating thickness was about 1.5 mils. The mold was taken from the oven and placed in an independent section glass-forming machine to produce pint size, wide-mouth bottles. The molds produced bottles at a rate of 10 bottles per minute for 16 hours before swabbing was necessary, and then swabbed every 2.5 hours with Composition A. The bottles were of excellent quality.

EXAMPLE IX

A clean blank mold and neck ring mold in conventional glass-forming machine were lubricated by swabbing every hour to produce 32 oz. glass containers, the lubricating composition comprising about 92 parts by weight of epoxidized linseed oil (Admex ELO, a trademark of the Ashland Chemical Company, Columbus, Ohio), 4 parts by weight of graphite and 2 parts by weight of carbon black having mixed therein 1 part of an emulsifying agent (Emulphor El-620, a trademark of GAF, New York, N.Y.), and 1 part by weight polyphenylene sulfide. This mixture was thoroughly blended for about 30 minutes and thereafter ball milled for about 24 hours until it had an average viscosity of about 3,000 cps as determined by Brookfield, Spindle No. 4, RPM 60 (72° F.).

The swabbed molds performed very satisfactorily in that no cracks or sticking were noted in the manufacture of glass articles produced and there was substantial, if not complete, reduction of smoking or plume noted in the vicinity of the glass-forming machine.

EXAMPLE X

A composition was prepared by taking about 62 parts by weight of an epoxidized linseed oil (Admex ELO, Ashland Chemical Company, Columbus, Ohio), about 32 parts by weight of ethoxylated aliphatic alcohol (Arosurf 66 E-10, Ashland Chemical Company, Columbus, Ohio) to which were added about 1 part by weight graphite, and about 2 parts by weight carbon black along with 1 part by weight polyphenylene sulfide. This mixture was blended thoroughly for about 30 minutes and thereafter mixed in a ball mill at room temperature for at least 18 hours until the mixture had an average viscosity of about 1,100 cps as determined by Brookfield, Spindle No. 4, RPM 60 (72° F.).

The lubricating composition was swabbed onto the molding surfaces of an individual section glass-forming machine. The swabbing was repeated about every 45 minutes. Satisfactory 16 oz. glass containers were produced continuously at normal manufacture speeds and output with little smoke production.

While the subject invention is described in detail in several embodiments, which this invention may assume in practice, it will be appreciated to those skilled in the art that there are changes and modifications that may be made without departing from this invention, the scope of which is defined in the following claims.

I claim:

1. A release and lubricating composition comprising a dispersion of about 0.5 to about 20 weight percent polyphenylene sulfide, about 0.2 to about 60 weight percent graphite and about 20 to about 99 weight percent of a carrier having a boiling point of about 350° F or greater, said carrier being selected from the group consisting of polyalkylene oxide, epoxidized glyceride and a polyhydric alcohol selected from the group consisting of ethylene glycol, glycerin, sorbitol and mixtures thereof.

2. The release and lubricating composition of claim 1 wherein said graphite has a particle size less than 50 microns.

3. The release and lubricating composition of claim 1 wherein said polyphenylene sulfide has an average molecular weight in excess of 1000.

4. The release and lubricating composition of claim 1 wherein said graphite is present in an amount of about 2 to about 30 weight percent.

5. The release and lubricating composition of claim 1 wherein said polyphenylene sulfide is present in an amount of about 0.5 to 15 weight percent.

6. The release and lubricating composition of claim 1 which also includes about 1 to about 2 percent by weight of a wetting agent selected from octylphenoxy polyethoxy ethanol, polyethylene glycol ether, a mixture of linear $C_{11}$ to $C_{15}$ alcohols or ethoxylated aliphatic alcohols.

7. The release and lubricating composition of claim 1 which also includes between about 0.01 to about 5 percent by weight of a thickening agent selected from carboxymethyl cellulose, hydroxy propoxymethyl cellulose, hydroxymethyl cellulose, methyl cellulose and ethyl hydroxyethyl cellulose.

8. A release and lubricating composition comprising about 11 weight percent polyphenylene sulfide, about 7 weight percent graphite, about 64 weight percent n-butoxy poly (ethoxypropoxy) propanol, about 1.6 weight percent octylphenoxy polyethoxy ethanol, about 0.4 weight percent carboxymethyl cellulose and about 16 weight percent water.

9. A release and lubricating composition comprising about 10 weight percent polyphenylene sulfide, about 5 weight percent graphite, about 42 weight percent ethylene glycol, about 42 weight percent water and about 1 weight percent octylphenoxy polyethoxy ethanol.

10. A release and lubricating composition comprising about 4 weight percent graphite, about 2 weight percent carbon black, about 92 weight percent epoxidized linseed oil, about 1 weight percent polyphenylene sulfide and about 1 weight percent emulsifying agent.

* * * * *